United States Patent [19]

Hancock

[11] Patent Number: 5,343,356
[45] Date of Patent: Aug. 30, 1994

[54] PANELBOARD

[75] Inventor: Drew S. Hancock, Zebulon, N.C.

[73] Assignee: Siemens Energy & Automation, Inc., Aloharetta, Ga.

[21] Appl. No.: 999,448

[22] Filed: Dec. 31, 1992

[51] Int. Cl.⁵ ............................................. H02B 1/20
[52] U.S. Cl. .................................. 361/637; 174/68.2; 174/72 B; 361/648
[58] Field of Search ............ 174/68.2, 70 B, 71 B, 174/72 B, 99 B; 361/341, 346, 353, 355, 356, 358, 361, 363, 376

[56] References Cited

U.S. PATENT DOCUMENTS

| | | | |
|---|---|---|---|
| 2,511,995 | 6/1950 | Robertson et al. | 173/324 |
| 2,882,513 | 4/1959 | Olashaw | 339/198 |
| 2,986,676 | 5/1961 | Edmunds | 317/119 |
| 3,333,157 | 7/1967 | Stokes | 317/119 |
| 3,346,776 | 10/1967 | Olashaw | 317/117 |
| 3,375,411 | 3/1968 | Mrowka | 317/119 |
| 3,463,967 | 8/1969 | Klein | 317/119 |
| 3,588,620 | 6/1971 | Waslleski | 317/119 |
| 3,767,977 | 10/1973 | Bachman | 317/119 |
| 3,855,504 | 12/1974 | Olashaw | 317/120 |
| 3,858,092 | 12/1974 | Olashaw et al. | 317/120 |
| 4,079,439 | 3/1978 | Coles et al. | 361/355 |
| 4,118,754 | 10/1978 | Duggan | 361/355 |
| 4,142,225 | 2/1979 | Diersing et al. | 361/358 |
| 4,153,318 | 5/1979 | Bishop et al. | 339/22 B |
| 4,167,769 | 9/1979 | Luke et al. | 361/355 |
| 4,251,851 | 2/1981 | Diersing et al. | 361/363 |
| 4,536,823 | 8/1985 | Ingram et al. | 361/355 |
| 4,602,312 | 7/1986 | Takahashi | 361/342 |
| 4,667,269 | 5/1987 | Morby et al. | 361/376 |
| 4,783,718 | 11/1988 | Raabe et al. | 361/353 |

Primary Examiner—Gregory D. Thompson
Attorney, Agent, or Firm—Peter A. Luccarelli, Jr.

[57] ABSTRACT

A panelboard (30) for distribution of electrical power from a feed line to branch power lines having at least one neutral/bus support assembly (44), with at least one insulating member (100) having a locating pin (52, 54, 56) projecting therefrom. The assembly (44) has a conductive neutral tie strap (70) attached to the insulating member (100) for conduction of neutral phase current. The strap (70) provides attachment points (124) for a neutral lug (39), and for structural support of the neutral/bus support assembly (44) in conjunction with the insulating member (100). At least one neutral rail (68) is connected to the neutral tie strap (70). The panelboard (30) has at least one busbar (46, 48, 50) disposed over the neutral/bus support assembly (44), defining a hole (151) therein for capture therein of a locating pin (52, 54, 56). The busbars (46, 48, 50) are adapted for transferring electrical power from a feed line to a line end of a branch circuit breaker (36) which is connectable to the busbar. A top barrier (58) is disposed over the busbars (46, 48, 50) and connected to the neutral/bus support (44) for capturing the busbars therebetween.

22 Claims, 18 Drawing Sheets

FIG. 3
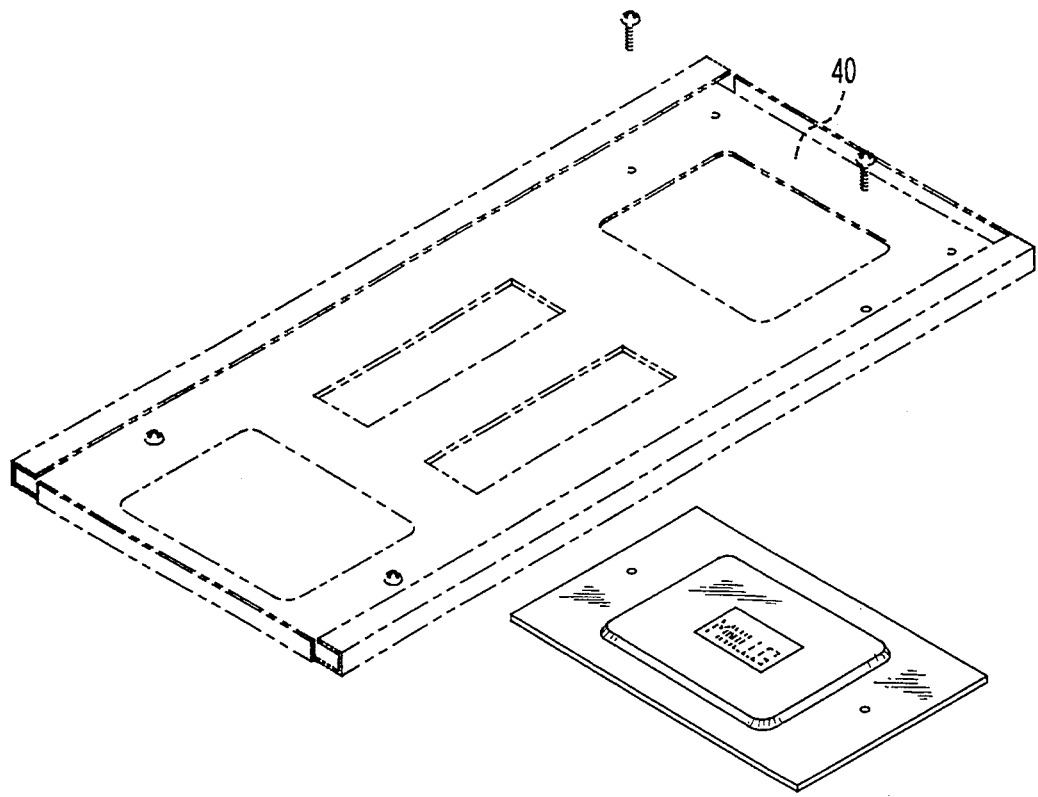
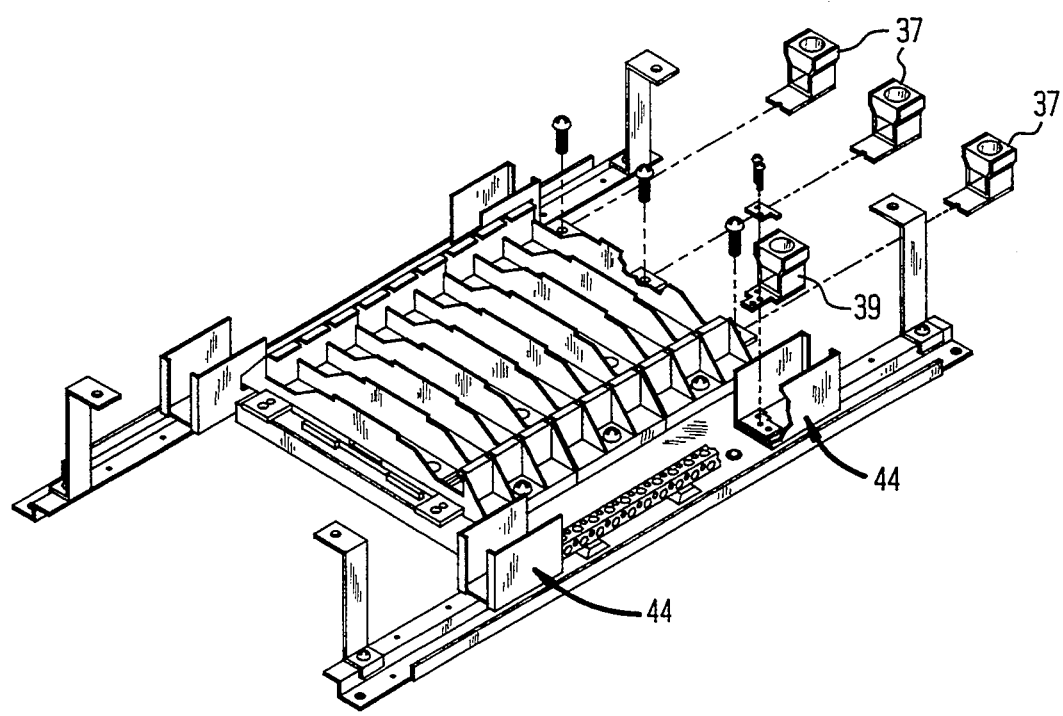

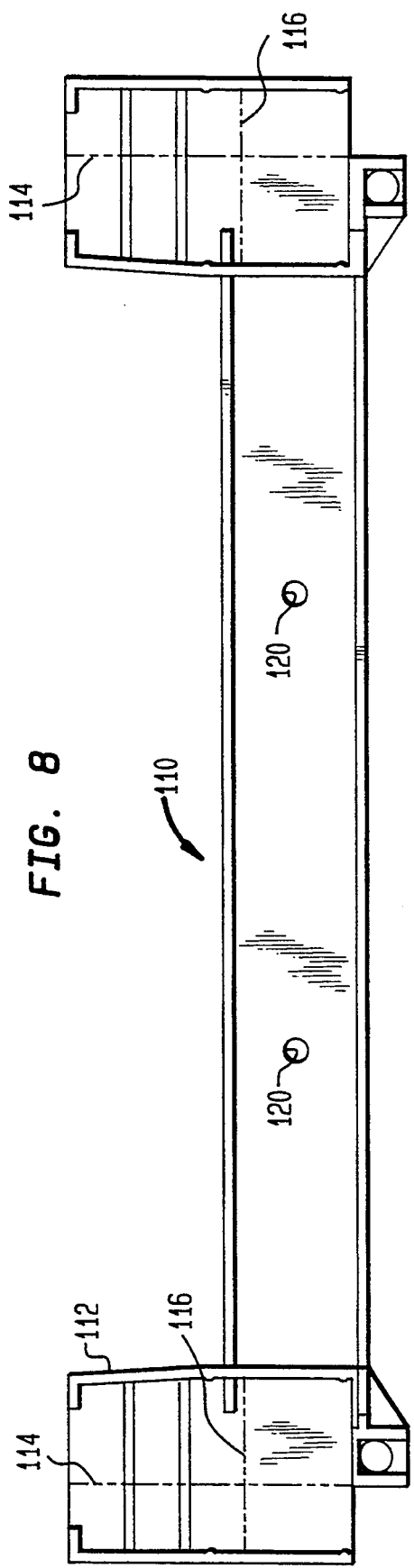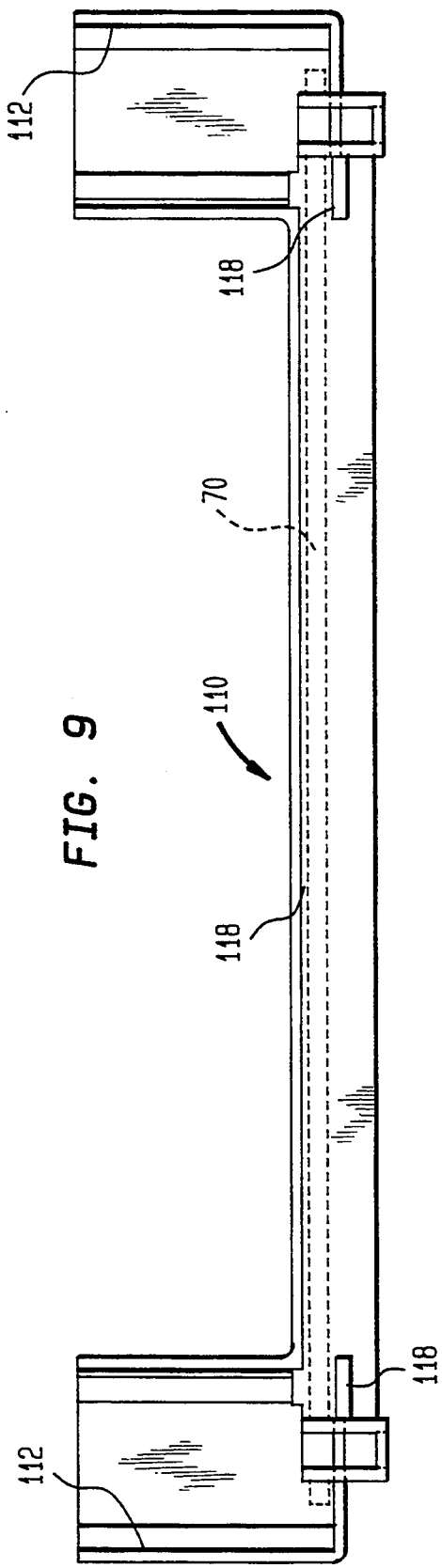

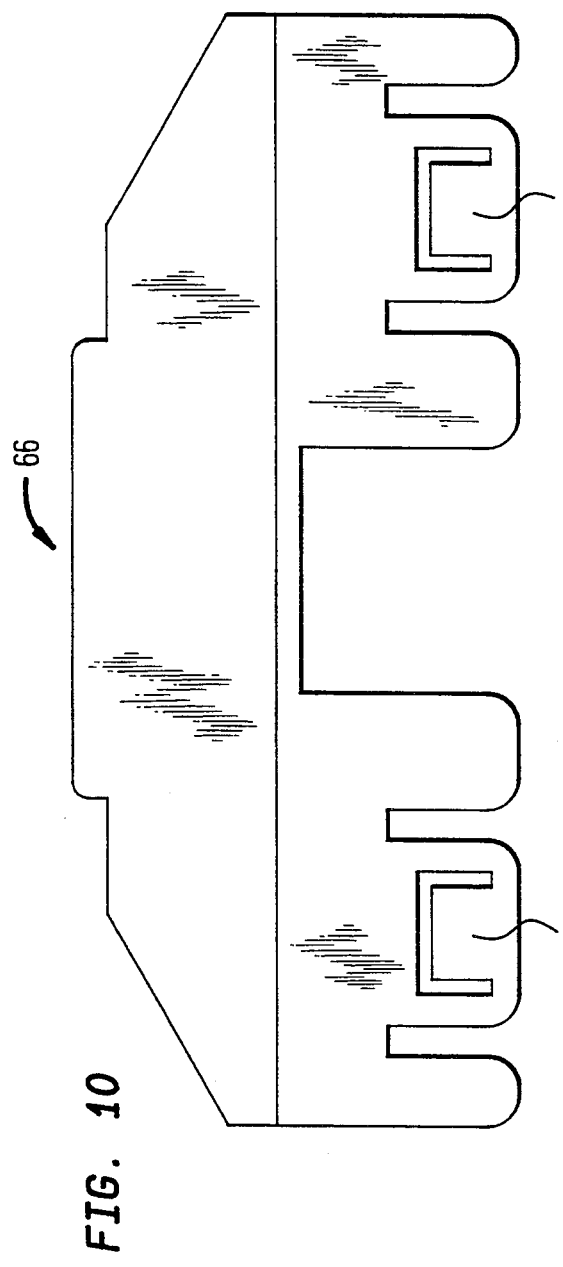
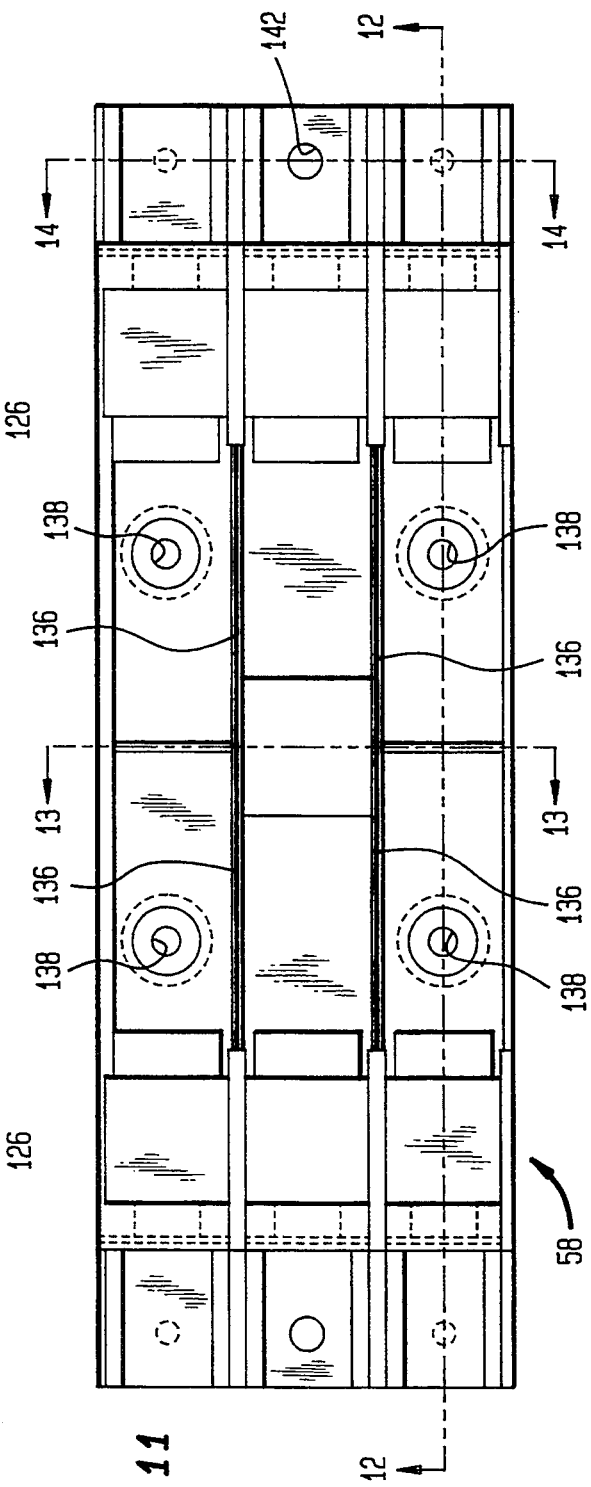
FIG. 10
FIG. 11

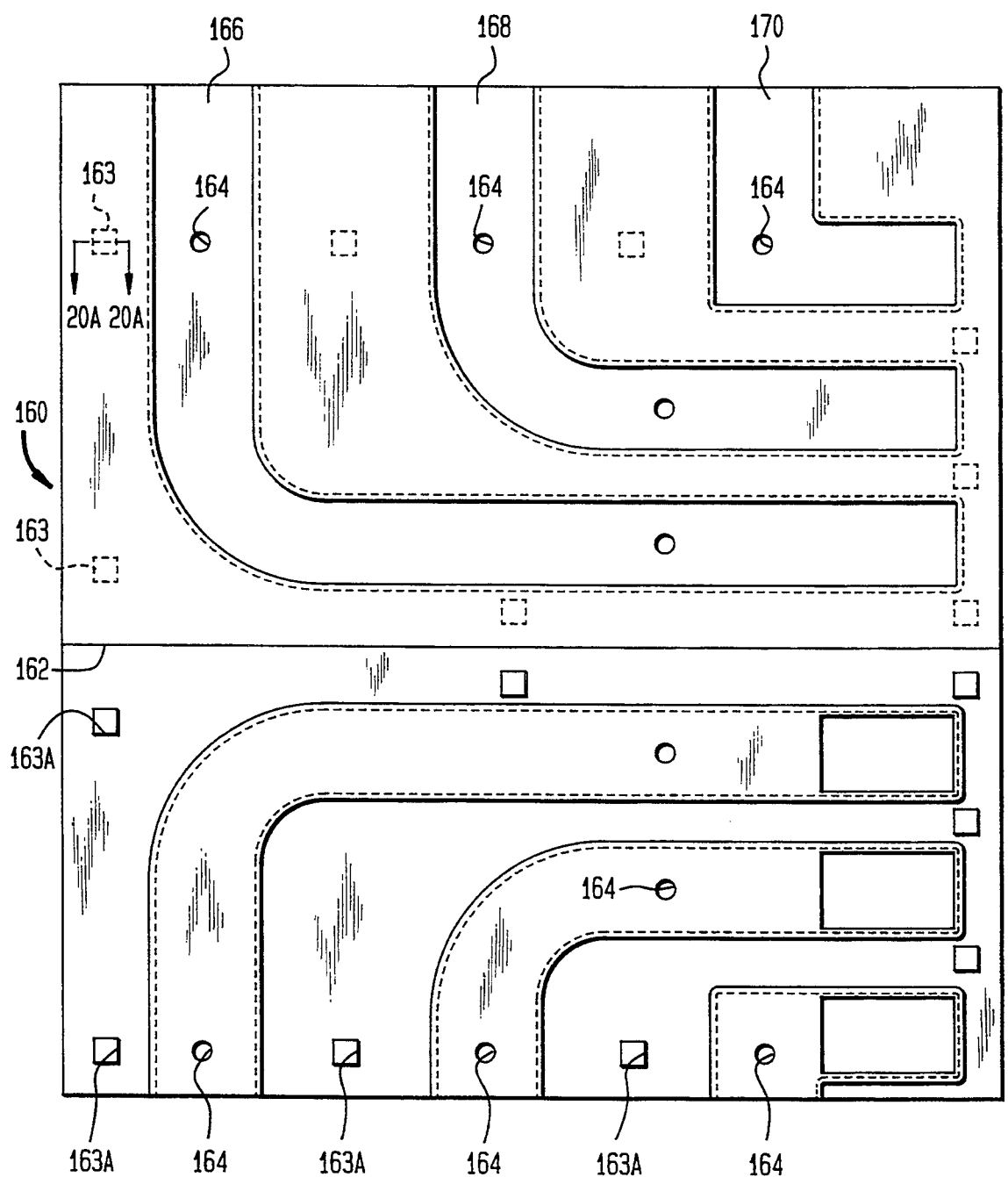

PANELBOARD

BACKGROUND OF THE INVENTION

The present invention is directed to circuit protection panelboards used to transfer power from a power line to associated branch lines, wherein each branch line is protected by a circuit breaker.

A related patent application entitled "Main Circuit Breaker or Other Circuit Protective Device Connector Installation Kit for Panelboards" Ser. No. 07/999,447, filed Dec. 31, 1992, invented by the same inventor of the present patent application and also owned by Siemens Energy & Automation, Inc. was filed on the same day as this application.

The entire contents of U.S. Pat. Nos. 4,118,754; 4,167,769; and 4,536,823 are hereby incorporated by reference as if fully set forth herein. These patents are owned by Siemens Energy & Automation, Inc., which is the owner of the present application.

Panelboard purchasers desire panelboards which can be readily wired from top or bottom feed positions without the need to disassemble the unit. In order to avoid the need for panelboard disassembly to reconfigure for top or bottom feed, the phase and neutral power line connections must be readily installable on either end of the panelboard in either of so-called "main lug" or "main breaker/switch" applications. Customers also want higher neutral current capacity in panelboards in order to compensate for non-linear loads in branch lines which draw current in abrupt pulses rather than in a smooth sinusoidal manner. Customers also want more compact panelboards so as to preserve space in their facilities.

The panelboard of the present invention meets consumer desires through a compact, symmetrical design which readily allows conversion from main lug power line connection to main breaker power line connection from either top or bottom feed positions. The neutral system of the present invention panelboard allows ready attachment of the neutral lug in any one of four positions and its current carrying capacity is increased over known panelboard designs.

SUMMARY OF THE INVENTION

The panelboard of the present invention has at least one neutral/bus support assembly with at least one insulating member having a locating pin projecting therefrom. The assembly has a conductive neutral tie strap attached to the insulating member for conduction of neutral phase current. The strap provides attachment points for a neutral lug and for structural support of the neutral/bus support assembly in conjunction with the insulating member. At least one neutral rail is connected to the neutral tie strap. The panelboard has at least one busbar disposed over the neutral/bus support assembly, defining a hole therein for capture therein of a locating pin. The busbars are adapted for transferring electrical power from a feed line to a line end of a branch circuit breaker which is connectable to the busbar. A top barrier is disposed over the busbars and connected to the neutral/bus support for capturing the busbars therebetween.

Other embodiments of the present invention are directed to a panelboard for distribution of electrical power from a feed line to branch power lines comprising at least one neutral/bus support assembly having an insulating bus support having at least one locating pin projecting therefrom. The neutral/bus support assembly also has an insulating neutral barrier having a gutter barrier on one end thereof and a conductive neutral tie strap having a periphery at least partially shielded by the neutral barrier and attached to both the neutral barrier and the bus support for conduction of neutral phase current, providing an attachment point for a neutral lug, and for structural support of the neutral/bus support assembly. The panelboard has at least one neutral rail connected to the neutral tie strap. At least one busbar is disposed over the neutral/bus support assembly; it defines a hole therein for capture therein of a locating pin. The busbar is adapted for transferring electrical power from a feed line to a line end of a branch circuit breaker connectable to the busbar. The panelboard has a top barrier disposed over the busbar and connected to the neutral/bus support for capturing the busbar therebetween. The top barrier has a top surface adapted for placement of branch circuit breaker thereon.

The present invention is also related to a panelboard for distribution of electrical power from a feed line to branch power lines comprising a panelboard enclosure and a pair of base rails attached to the panelboard enclosure. The panelboard has a pair of neutral/bus support assemblies each having an insulating bus support having at least one locating pin projecting therefrom, an insulating neutral barrier having a gutter barrier on one end thereof and a conductive neutral tie strap having a periphery at least partially shielded by the neutral barrier and attached to both the neutral barrier and the bus support. The neutral tie strap provides an attachment point for a neutral lug at a position which is shielded by the gutter barrier, and provides structural support for the neutral/bus support assembly. The panelboard has a pair of neutral rails connected to both of the neutral tie straps. At least one busbar is disposed over the neutral/bus support assemblies, defining a pair of holes therein for capture therein of a locating pin projecting from each of the bus supports. The busbar is adapted for transferring electrical power from a feed line to a line end of a branch circuit breaker connectable to the busbar. The panelboard also has a top barrier disposed over the busbar and connected to each of the neutral/bus supports for capturing the busbar therebetween. The top barrier is also connected to each of the base rails and has a top surface adapted for attachment of branch circuit breaker thereon.

DESCRIPTION OF THE DRAWINGS

FIG. 3 is an exploded view of a panelboard of the present invention set up in a main lug power feed configuration.

FIG. 8 is a top plan view of a neutral barrier of the neutral/bus support assembly of FIG. 5.

FIG. 9 is an elevational view of a neutral barrier of FIG. 8, showing a neutral tie strap in phantom view.

FIG. 10 is an elevational view of an end barrier of the panelboard of the present invention.

FIG. 11 is a top plan view of a portion of a top barrier of the panelboard of the present invention.

FIG. 20 is an exterior plan view of an empty clamshell insulator.

DESCRIPTION OF THE PREFERRED EMBODIMENT

Generalized Overview of the Panelboard Subsystems

Figure 1:
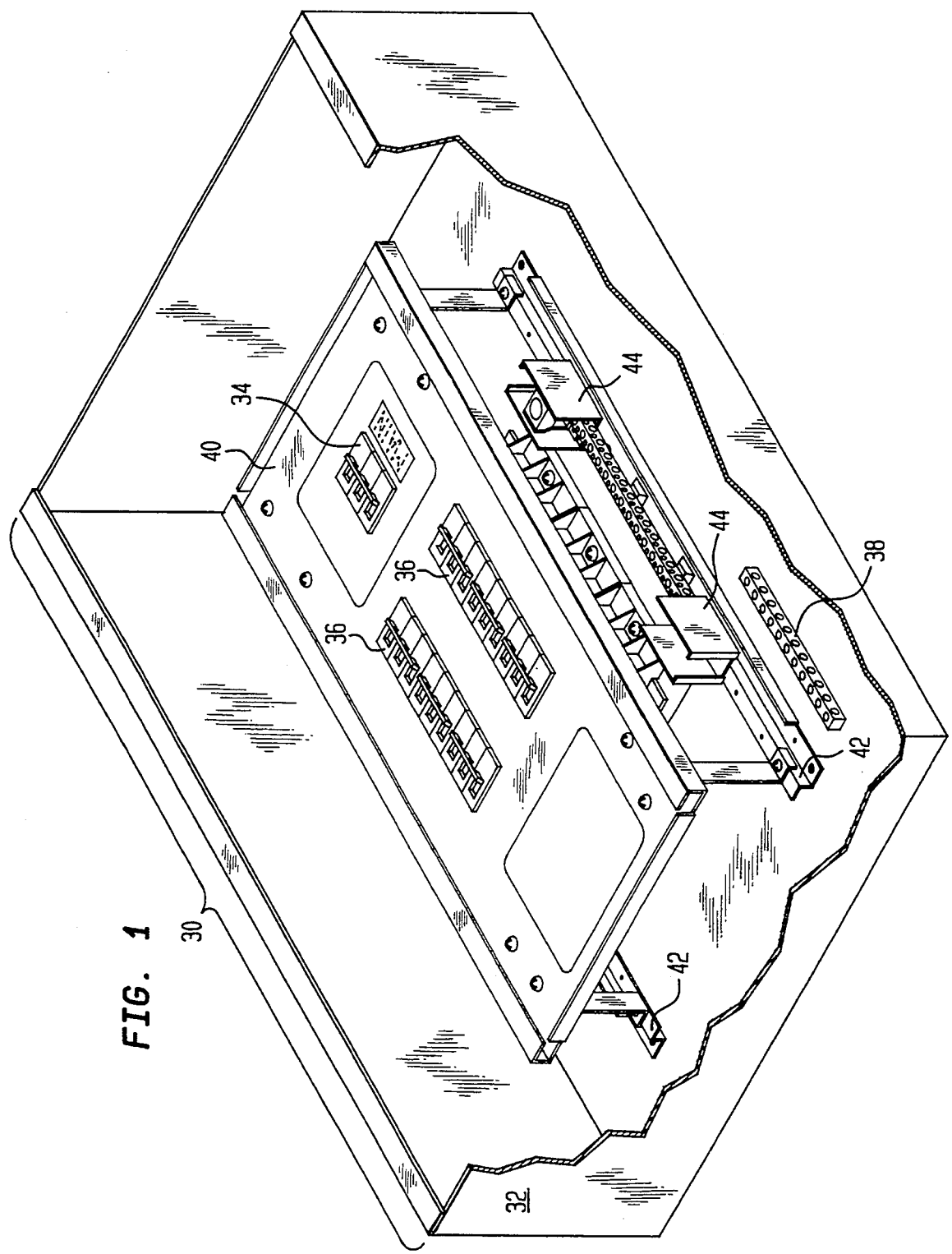
FIG. 1 is a perspective view of a panelboard of the present invention.
Figure 2:
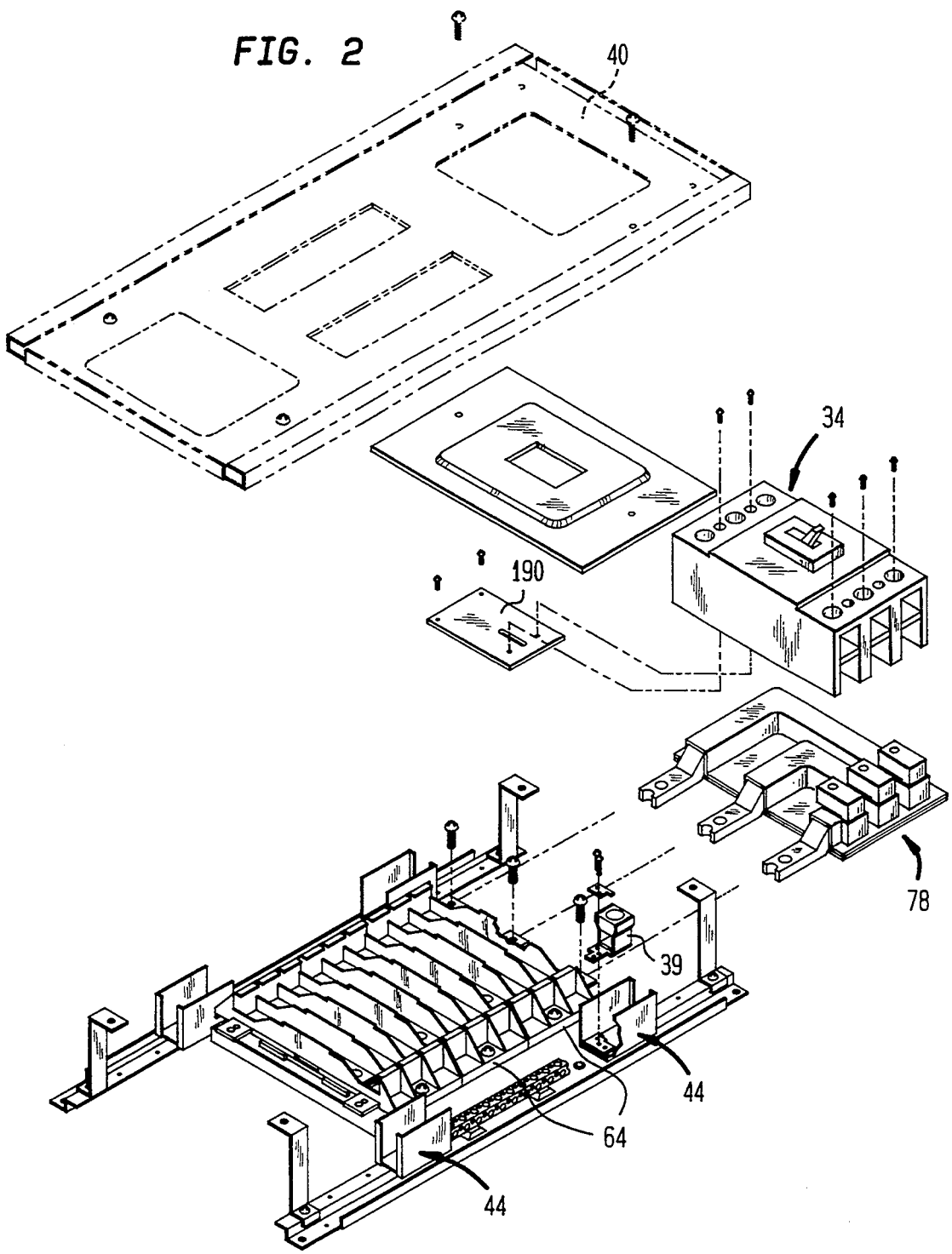
FIG. 2 is an exploded view of a panelboard of the present invention set up in a main breaker power feed configuration.

FIGS. 1–4 show generally the basic subsystems of the panelboard 30 of the present invention. FIG. 1 shows the protective enclosure 32, which prevents inadvertent contact with electrically conducting internal components and inhibits entry of airborne contaminants into the panelboard 30. FIGS. 1 and 2 show a so-called "main breaker"-type panelboard and FIG. 3 shows a so-called "main lug" type panelboard. The former interposes a molded case circuit breaker 34 as the "main breaker" between the load protecting branch breakers 36 and the line source of electrical power (not shown). Installation connector 78 effectuates electrical continuity between the main breaker 34 and busbars which are in turn connected to the branch breakers 36. The latter directly connects with main lugs 37 the line source of power to busbars which in turn connect to the branch breakers 36. The structure of the busbars will be described later herein.

Figure 25:
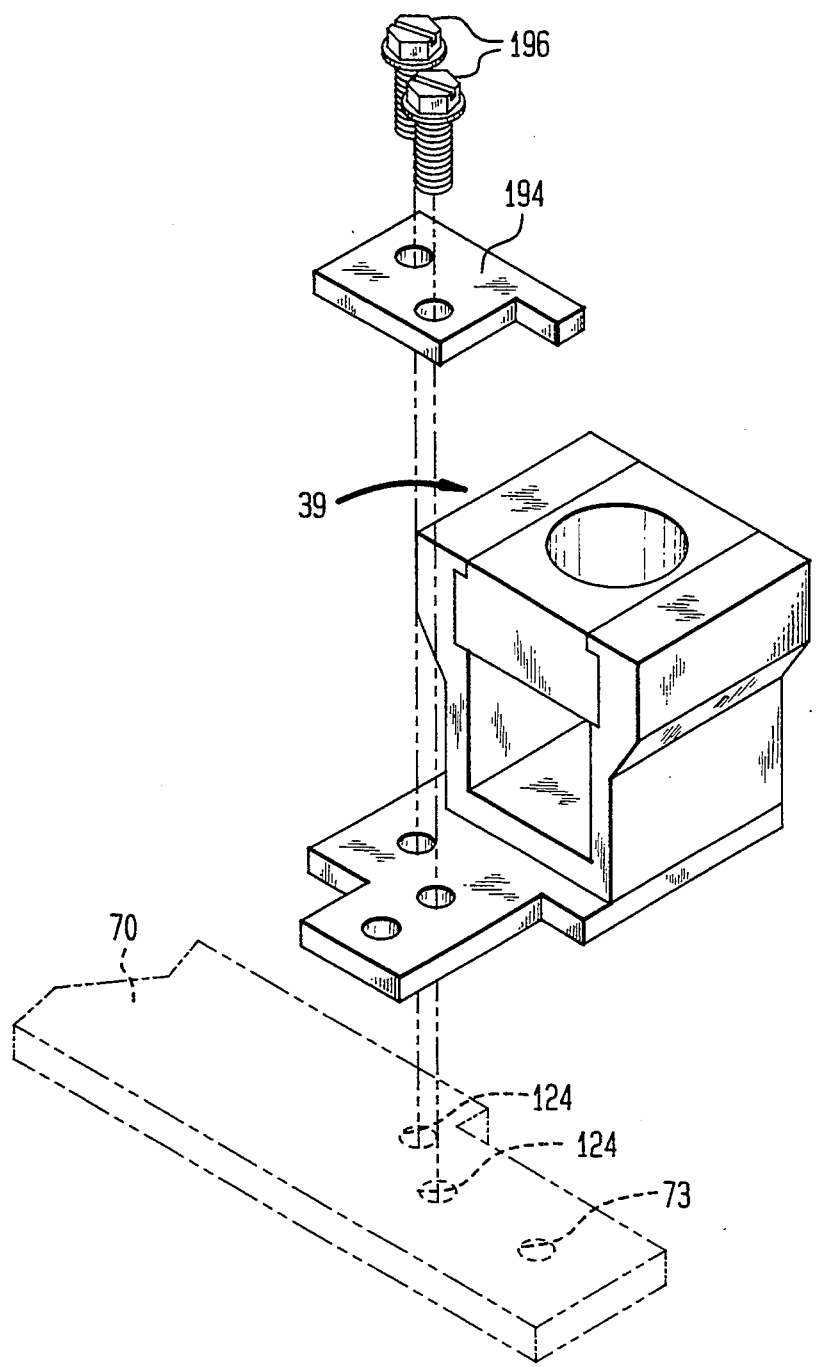
FIG. 25 shows a neutral lug of the panelboard of the present invention shown in an exploded view over its mounting point on the neutral tie strap.

As shown in FIG. 1, the panelboard 30 may also have a ground connector rail 38, which provides for grounding of components within the panelboard in conventional fashion known to those skilled in the art. Neutral lug 39, shown in FIGS. 2, 3 and 25, provides a connection point for the neutral power line to the panelboard 30. Referring to FIGS. 1–4, dead front 40 allows operator access to actuating handles of the breakers 34 and 36, but inhibits inadvertent contact with live internal components within the panelboard 30; it also inhibits entry of contaminants into the panelboard.

Figure 4:
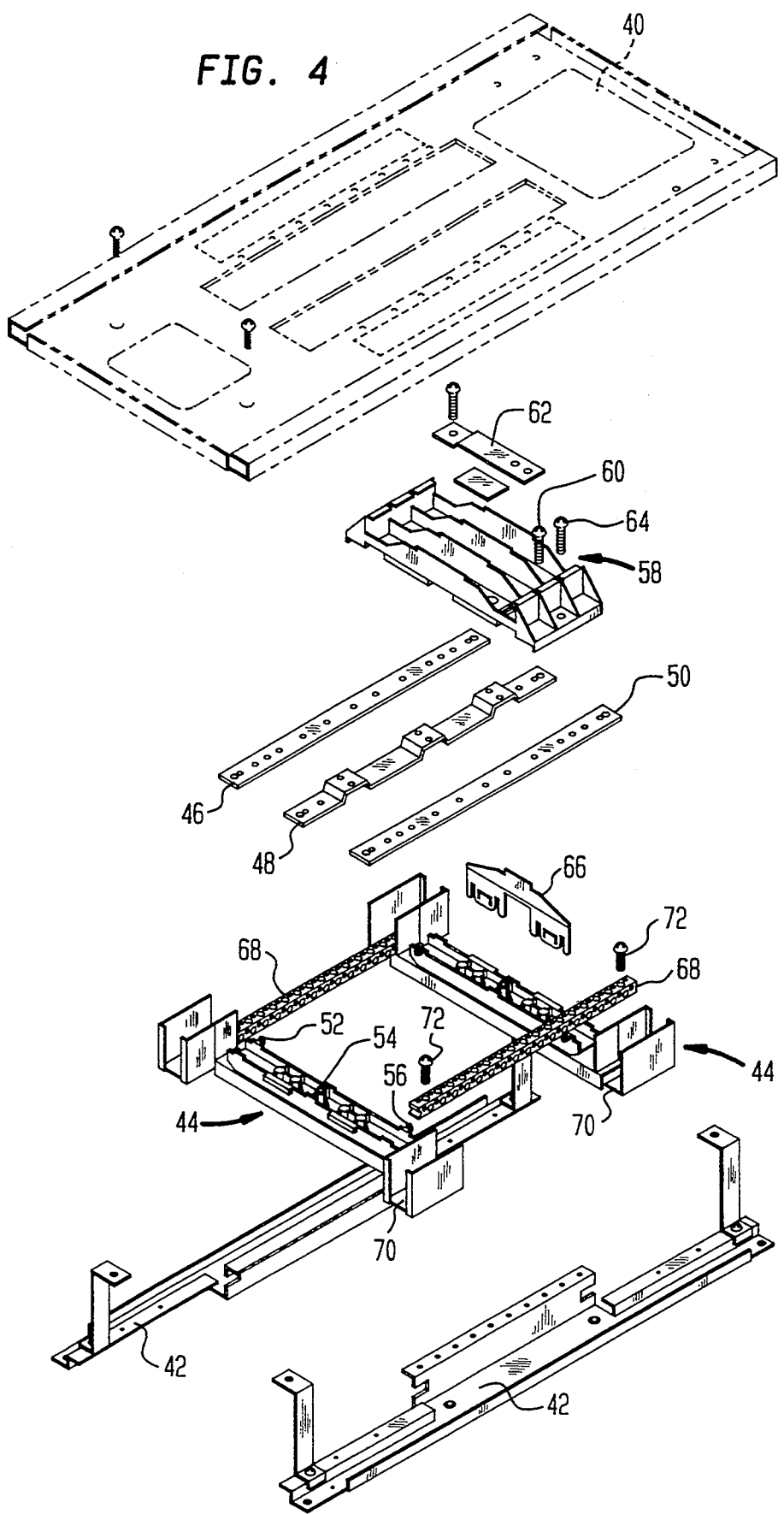
FIG. 4 is another exploded view of a panelboard of the present invention.
Figure 5:
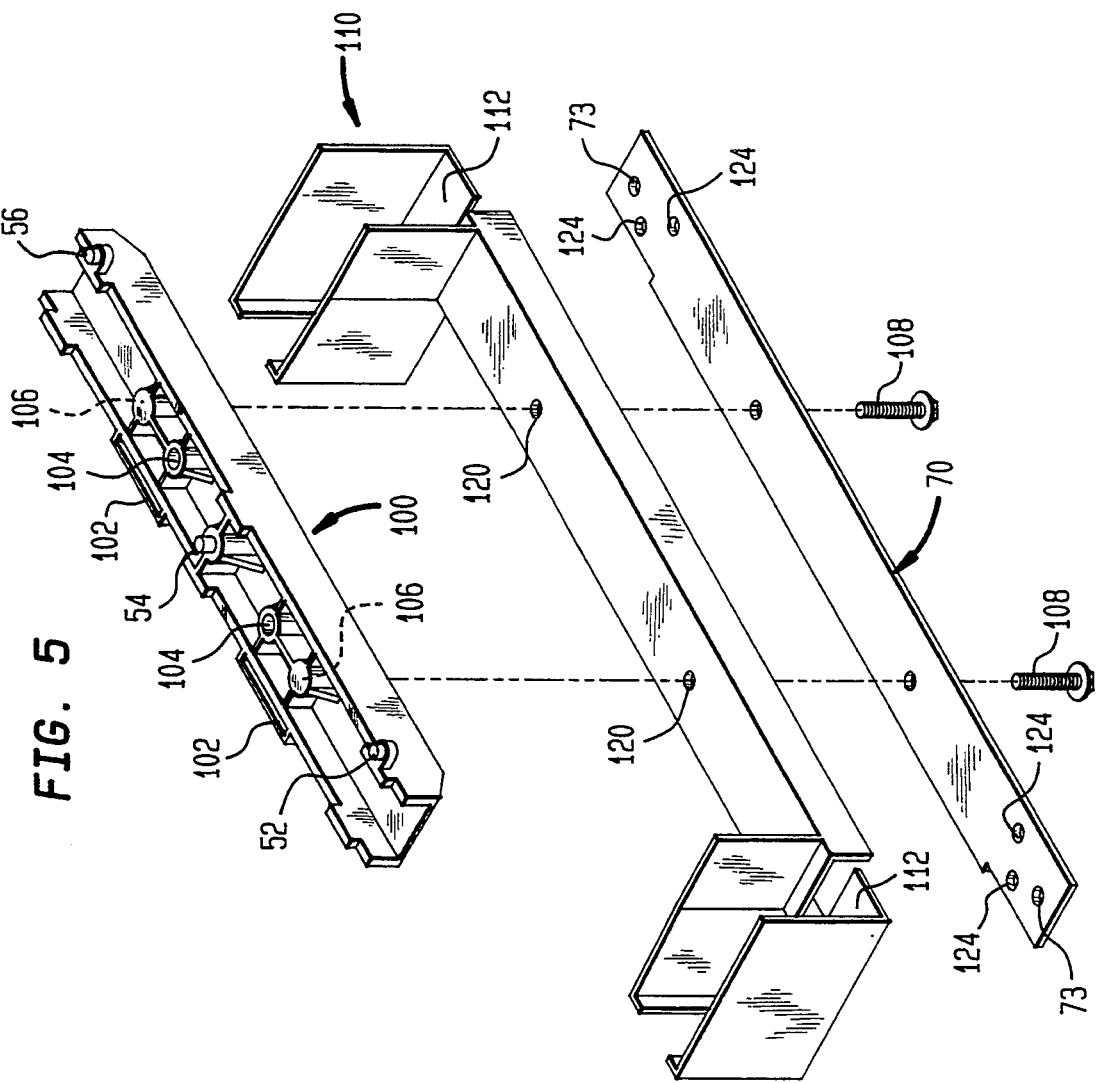
FIG. 5 is an exploded view of a neutral/bus support assembly of the panelboard of the present invention.
Figure 6:
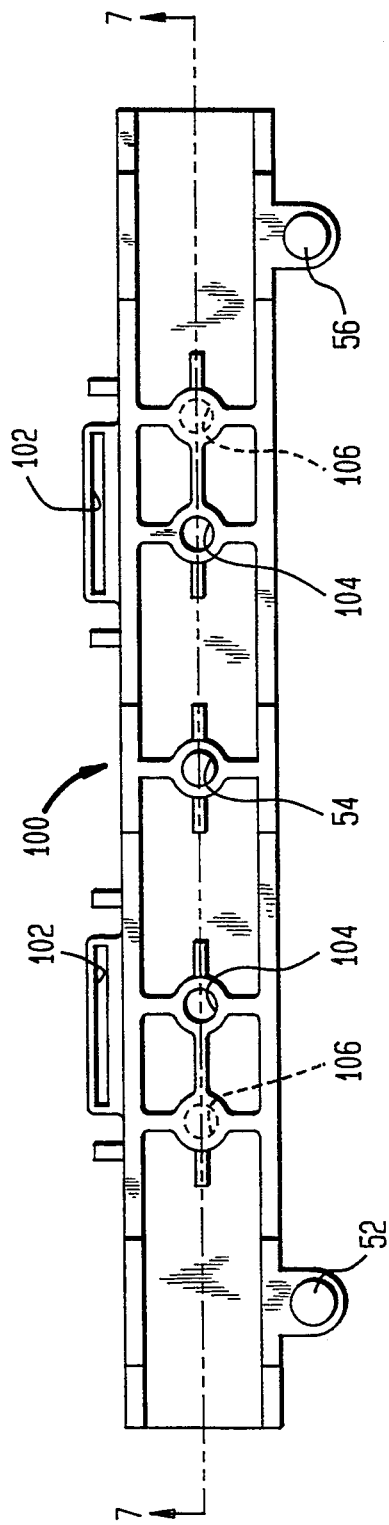
FIG. 6 is a top plan view of a bus support of the neutral/bus support assembly of FIG. 5.
Figure 7:
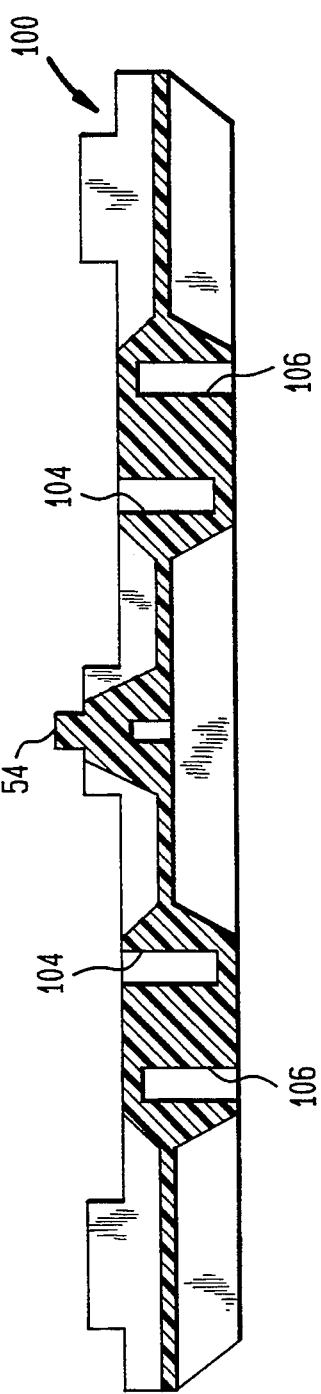
FIG. 7 is a elevational sectional view of the bus support of FIG. 6 taken along 7—7 thereof.
Figure 12:
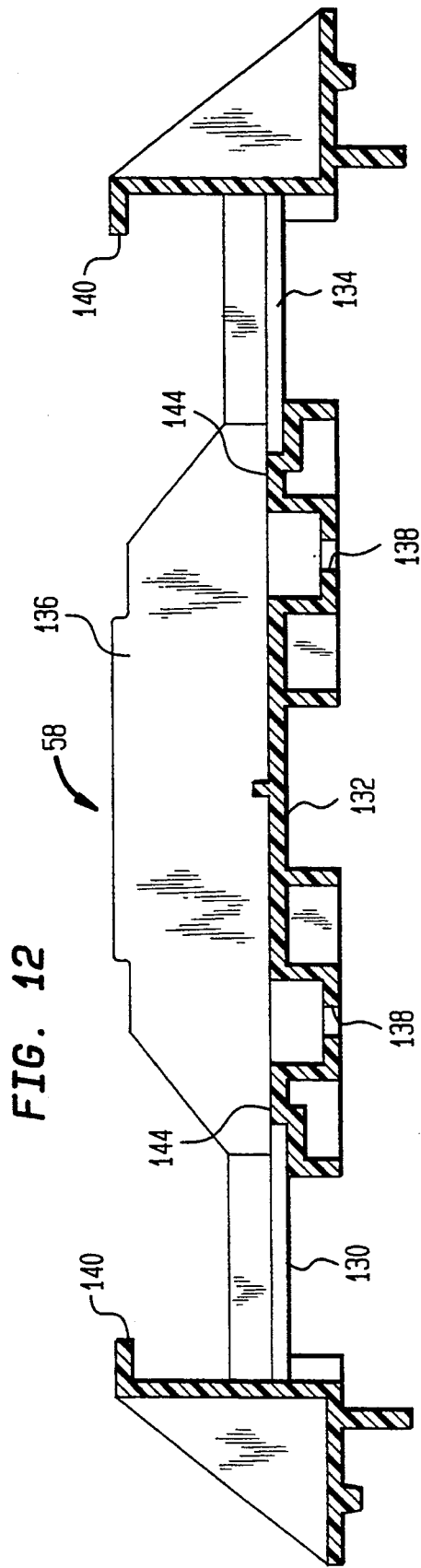
FIG. 12 is an elevational sectional view of the top barrier of FIG. 11 taken along 12—12 thereof.
Figure 14:
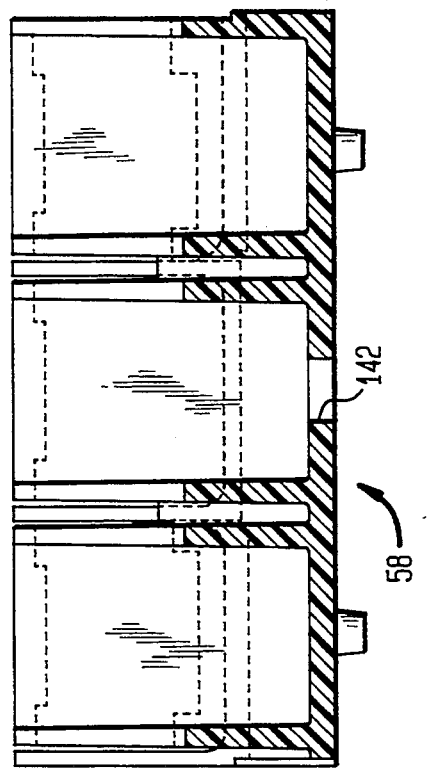
FIG. 14 is an elevational sectional view of the top barrier of FIG. 11 taken along 14—14 thereof.
Figure 13:
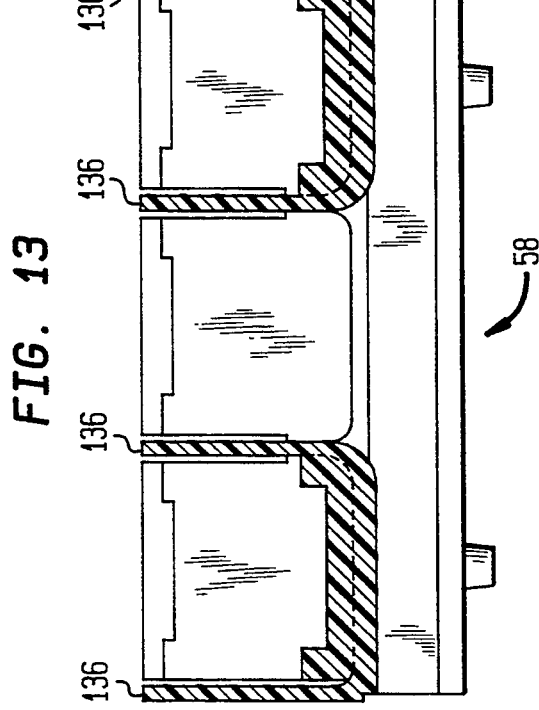
FIG. 13 is an elevational sectional view of the top barrier of FIG. 11 taken along 13—13 thereof.

FIG. 4 shows in a detailed exploded view features of the panelboard 30 which are common to all embodiments of the invention. Base rails 42 are preferably symmetrical in order to minimize the number of different components and allow cable feeding from the top or bottom. The base rails 42 unitize the overall structure of the internal components of the panelboard 30 and provide the attachment points to the enclosure 32. All of the internal components of the panelboard 30 may be assembled outside enclosure 32 and then mounted as one unitized assembly into the enclosure. Assembly outside the enclosure 32 allows easier access by assembly personnel and facilitates easier application of robotic assembly techniques.

A pair of neutral/bus support assemblies 44 are placed on top of but not affixed directly to base rails 42. The detailed construction of the neutral/bus support assemblies 44 will be described later herein. As shown in FIG. 4, the panelboard has three phase busbars 46, 48, and 50, which are designated the A, B, and C phases, respectively. While a three-phase panelboard is shown in FIG. 4, it should be understood that a panelboard constructed in accordance with the teachings of the present invention may have single- or three-phase construction.

Each of the busbars 46, 48 and 50 shown in FIG. 4 define holes (see holes 150 in FIG. 15) which capture respective locating pins 52, 54 and 56 formed on the neutral/bus support assembly 44 top surface. By mounting the busbars 46, 48 and 50 over the locating pins 52, 54 and 56, the busbars are restrained laterally in the plane formed by the top surfaces of the two neutral/bus support assemblies 44.

Top barrier 58, formed of insulating material, is placed over the neutral/bus support assemblies 44 and captures the phase busbars 46, 48 and 50 therebetween. While only a portion of the top barrier 58 is shown in FIG. 4, it should be understood that it extends longitudinally, parallel to the phase busbars 46, 48 and neutral/bus support assemblies 44 with the busbars 46, 48 and 50 into a unitized and generally rigid fabrication.

As shown in FIG. 4, the A-phase busbar 46 has a transversely-mounted connecting strap 62 fastened to it to allow transfer of electrical power to the line side of a branch breaker 36 (not shown, but see FIG. 1 for the general alignment orientation concept). The same type of connecting strap 62 is utilized, symmetrically, for the C-phase busbar 50. The specific construction of the B-phase busbar 48 will be described in greater detail herein; it allows direct connection of the line side of a branch breaker 36 thereto without the need for a connecting strap. Alternatively, the busbars 46, 48 and 50 can be restrained by recesses formed in either or both of the neutral/bus support assembly or the top barrier 58. Also, either the top barrier 58 or the neutral/bus support assemblies 44 or both can be constructed with the locating pins 52, 54 and 56.

The now unitized top barrier 58, phase busbars 46,48 and 50 and the neutral/bus support assemblies 44 are connected to the base rails 42 with fasteners 64. End barrier 66 is connected to one of the neutral/bus support assemblies 44 in a manner to be described in greater detail herein with respect to the detailed descriptions of FIGS. 5–10.

The neutral current return path of the panelboard of the present invention is also shown in FIG. 4. A pair of split neutral rails 68 on both the left- and right-hand sides of the panelboard provide connection points for the neutrals for each branch breaker 36 by way of screw-in terminals as known in the panelboard art. See by way of example U.S. Pat. No. 4,167,769, also owned by Siemens Energy & Automation, Inc. The neutral system of the panelboard of the present invention preferably provides for two-hundred percent rated neutral return capacity. Neutral current capacity is enhanced by use of two neutral tie straps 70, with one strap allocated to each neutral/bus support assembly 44, the detailed structure of which will be described later in this specification text. Each end of the neutral rail 68 is fastened to a neutral tie strap 70 with fasteners 72 inserted into holes 73 defined by the tie strap. A neutral lug 39 (see FIGS. 2 and 3) may be attached to any end of a neutral strap 70, as will be described in greater detail in connection with FIG. 25.

The Neutral/Bus Support Assembly

FIGS. 5–9 describe the neutral/bus support assemblies 44 in greater detail. Each assembly 44 includes a bus support 100 (see FIGS. 6 and 7) and at least one, but preferably two receptacles 102 for capture of end barrier 66 therein. Bus support 100 includes on its top face the locating pins 52, 54 and 56 for laterally restraining each of the phase busses 46, 48 and 50. The bus support 100 also has two bores 104 on its top face for receiving fasteners 60 which connect the top barrier to the neutral/bus support assemblies 44. Bores 106 on the bottom face of each bus support 100 receive fasteners 108 which tie together the neutral tie strap 70, the bus support and the neutral barrier 110.

The neutral barrier 110 is shown in greater detail in FIGS. 8 and 9. Gutter barriers 112 for shielding of neutral lugs 39 is provided at each end of the neutral barrier 110. A so-called "living hinge" formed by a groove, depression or gentle radius in the gutter barrier 112 may be provided for flexibility of the barrier. As shown in FIG. 8, the living hinge is depicted by dotted-dashed lines 114 and 116. Either or both of living hinge lines 114 and 116 may be formed in gutter barrier portion 112, so that each neutral tie strap 70 is captured in a channel 118 formed by a corresponding neutral barrier 110. The living hinges 114 or 116 allow for flexing of the gutter barrier along the hinge line and slidable insertion of the tie strap 70 into channel 118 without the risk of damaging the material which forms the gutter 112. The neutral barrier 110 also has holes 120 formed therein for passage therethrough of fasteners 108. Each end of the neutral tie strap 70 has bores 124 for attachment of a neutral lug 39.

Neutral barrier 110 and bus support 100 are formed from any desirable insulating material known in the art. For example, the bus support 100 may be formed of plastic sold under the trademark NORYL, grade SE1, by the General Electric Company Plastics Division and the neutral barrier may be manufactured of a VO rated polypropylene having a relative temperature index of 105 degrees Celsius.

Referring to FIG. 10, the end barrier 66 provides shielding lateral shielding at the upper end of top barrier 58. The end barrier 66 has male snap fittings 126 which mate with the female receptacles 102 in bus support 100.

The Top Barrier

The top barrier 58 is shown in greater detail in FIGS. 11–14; it is preferably but not required to be formed of a single unitized, molded structure. A suitable insulating material is General Electric Plastics Division NORYL brand plastic, grade SE1. The bottom face of top barrier 58 preferably, but is not required to define slots 130, 132 and 134 for receipt therein of respective busbars 46, 48 and 50. The top barrier 58 also has vertical barriers 136 between each branch breaker mounting location. Holes 138 are formed in the top barrier 58 for passage of the top barrier to neutral/bus support 44 fasteners 60.

The top barrier 58 also has mounting hooks 140 for supporting the load ends of branch breakers 36, such as described in U.S. Pat. No. 4,118,754. Laterally at each of the left and right sides of top barrier 58 are holes 142 for passage therethrough of the fasteners 64 which attach the barrier to the base rails 42. The top barrier 58 also preferably has a support web 144 proximal the A and C phase busbars 46 and 50 for reinforcing the cantilevered connecting straps 62 that transmit electrical power from the busbar to the line end of the attached respective branch breaker 36.

The Busbars

Figure 15:
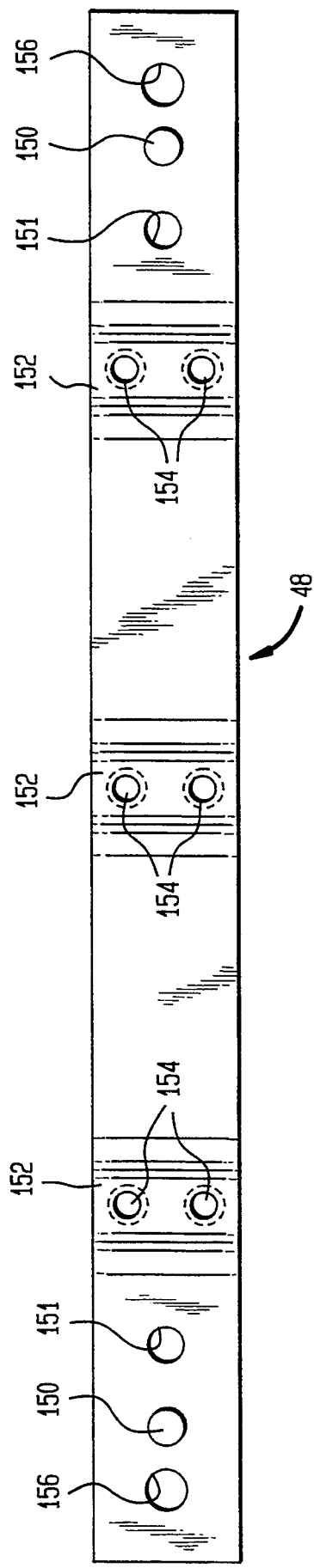
FIG. 15 is a top plan view of a center- or B-phase busbar of the panelboard of the present invention.
Figure 16:
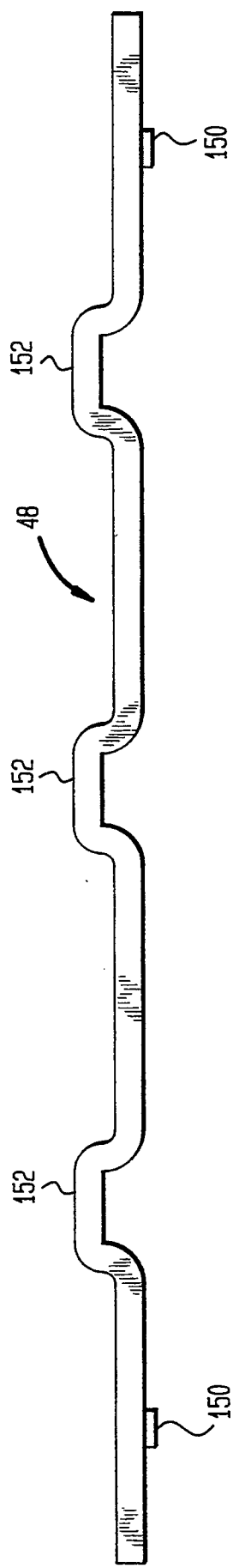
FIG. 16 is an elevational view of the busbar of FIG. 15.

Referring now to FIGS. 15 and 16, details of the center, B-phase busbar 48 and features common to the A- and C-phase busbars 46 and 50, respectively, will now be described. Each of the phase busbar conductors, 46, 48 and 50 are preferably constructed of tin plated stamped copper, in order to reduce manufacturing cost, but it is contemplated that any conductive material of stamped, cast or extruded construction commonly used in the panelboard industry may be used to construct the busbars.

All of the busbars 46, 58, and 50 preferably have antirotation dimples 150 projecting from the busbar surface which aid in the attachment of main lugs 37 or an installation connector 78 for a main breaker 34. Dimple 150 is preferably formed integrally with the busbar during the stamping process, but it is contemplated that it could be separately fabricated and attached to the busbar. The busbar 48 also has a formed hole 151 on each end thereof for receipt of locating pin 54 of the neutral/bus support 44. The A- and C-phase busbars 46 and 50 also have formed holes 151 for receipt of their respective locating pins 52 and 56.

As can be seen most clearly in FIG. 16, the B-phase busbar 48 has a plurality of upwardly projecting portions 152 so that the busbar appears to have a generally corrugated elevational view. Each raised portion 152 is a direct attachment point for the line end of a branch breaker 36 by way of holes 154, as is customary for commercial and industrial panelboard construction. Each end of the busbar 48 outboard of the antirotation dimples has a hole 156 for passage of a fastener therethrough which is used for attachment of a main lug 37 or a main breaker installation connector 78. It is noted that the A- and C-phase busbars 46 and 50 also have holes 156 for main lug 37 or connector 78 mounting. Holes 154 are also constructed in the A- and C-phase busbars 46 and 50, but they are for attachment of the connecting straps 62, so that all branch breakers 36 for all phases can be mounted with their line ends proximal the vertical centerline of the top barrier 58.

Main Breaker Installation Kit

The main breaker 34, when desired for certain applications, may be readily attached to the busbars 46, 48 and 50 by way of installation connector 78. Important features and benefits resulting from utilization of connector 78 include easy field conversion of a main lug panelboard 30 to a main breaker-type panelboard in the field and easy selective top or bottom feed of power cables into the panelboard. The installation connector 78 is factory assembled and self-supporting; an electrician need only position the fully assembled connector within the panelboard structure and connect it to each of the phase busbars 46, 48 and 50 with a single fastener.

Figure 17:
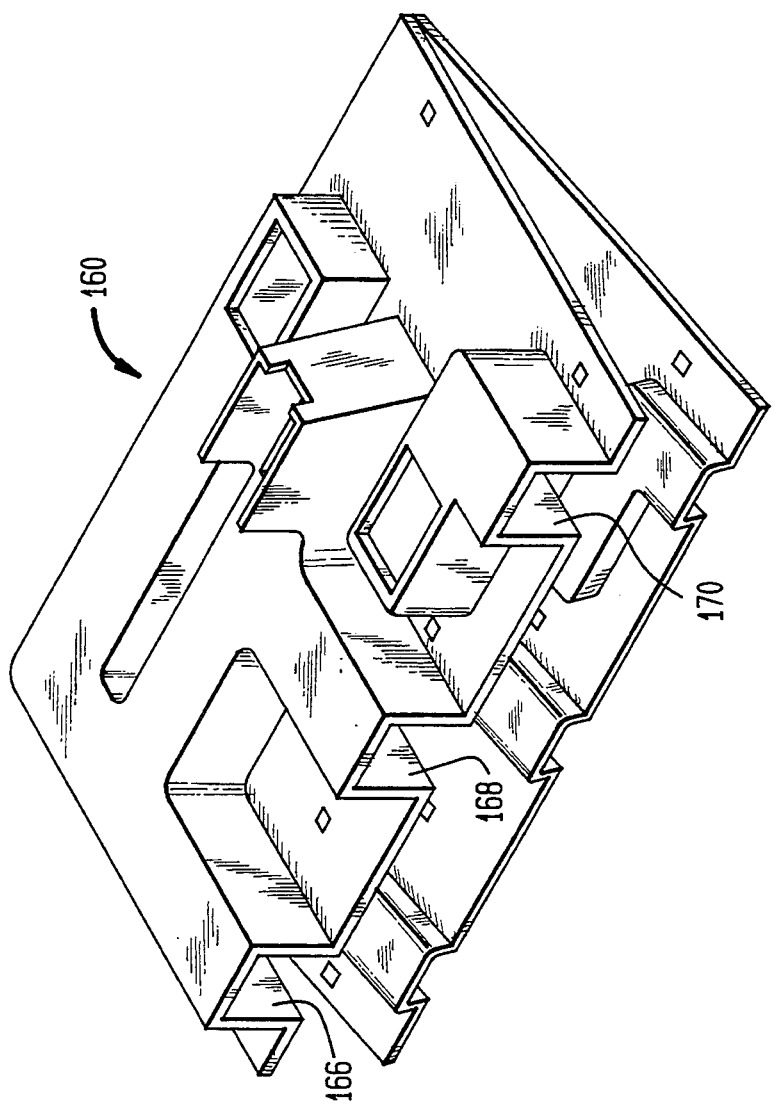
FIG. 17 is a perspective view of an empty clamshell insulator housing utilized in the main breaker installation connector of the panelboard of the present invention.
Figure 18:
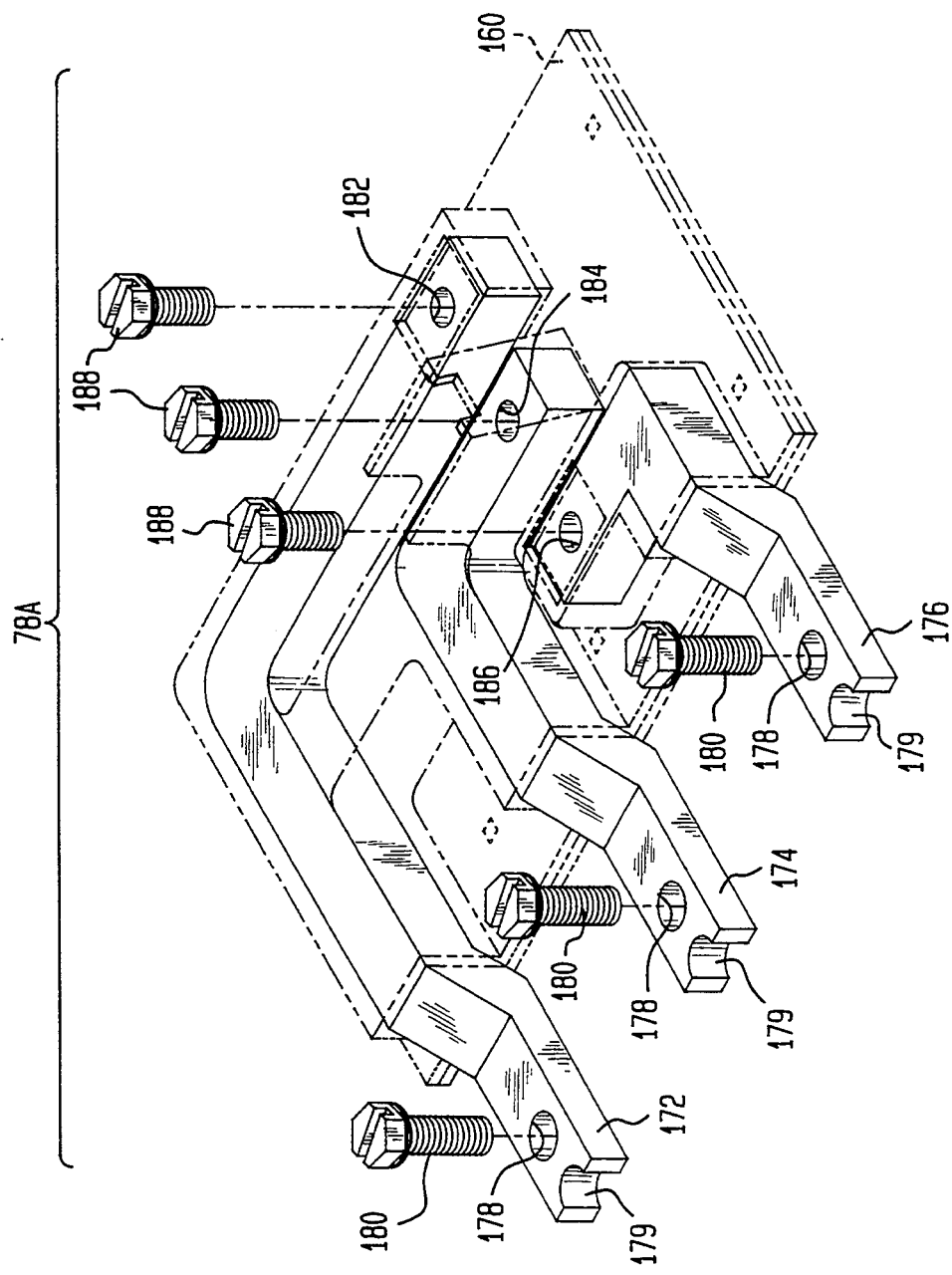
FIG. 18 is a perspective view of a three-phase application of the main breaker installation connector of the panelboard of the present invention.
Figure 19:
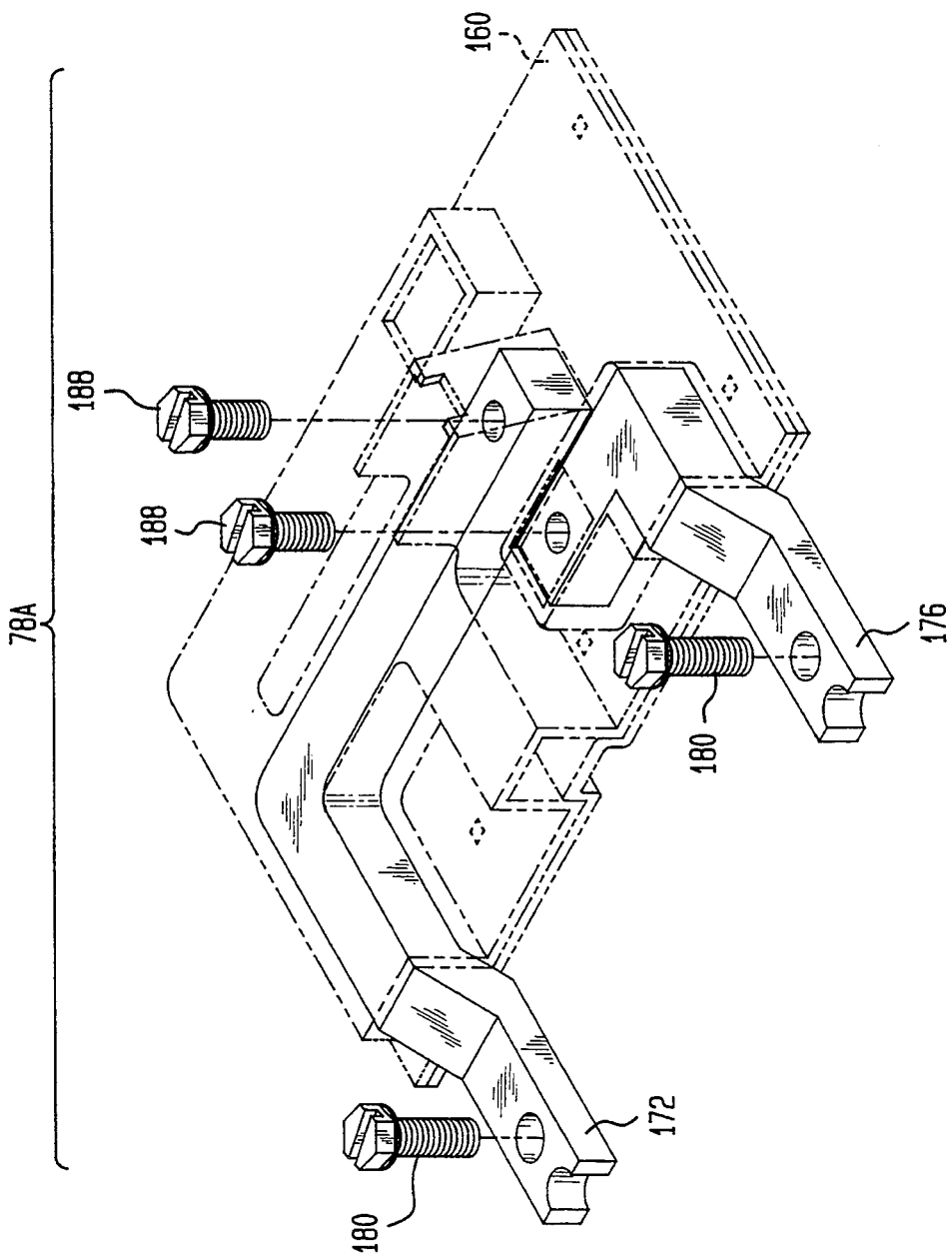
FIG. 19 is perspective view similar to that of FIG. 18 showing a two-phase application.
Figure 20A:
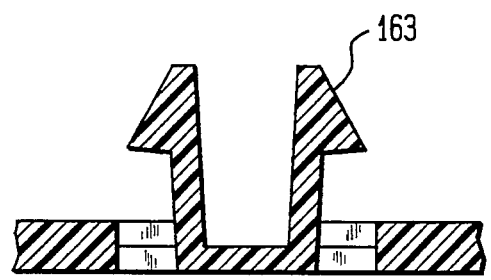
FIG. 20A is an elevational sectional view taken along 20A—20A of FIG. 20B, showing a detail of a fastener for connecting the two portions of the clamshell insulator of FIGS. 17 and 20 in a closed position as shown in FIGS. 18 and 19.
Figure 20B:
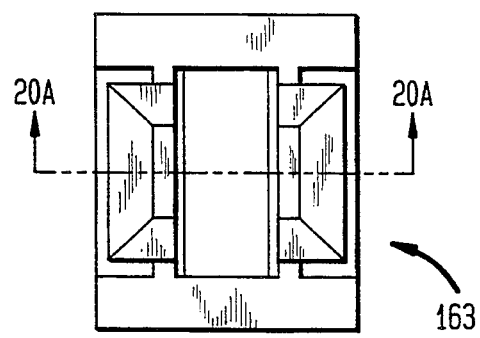
FIG. 20B is a detailed plan view of a fastener for connecting the two portions of the clamshell insulator of FIGS. 17 and 20 in a closed position as shown in FIGS. 18 and 19.
Figure 21:
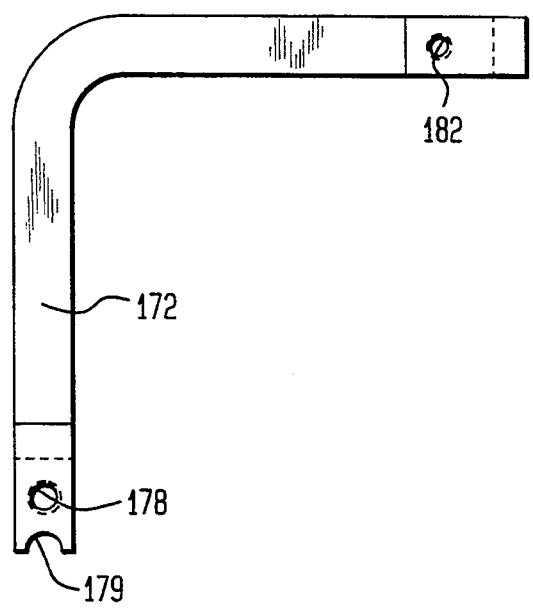
FIG. 21 is a top plan view of a phase connector of the main breaker installation connector of the present invention for establishing electrical continuity between a load contact of a main breaker and its corresponding busbar.
Figure 23:
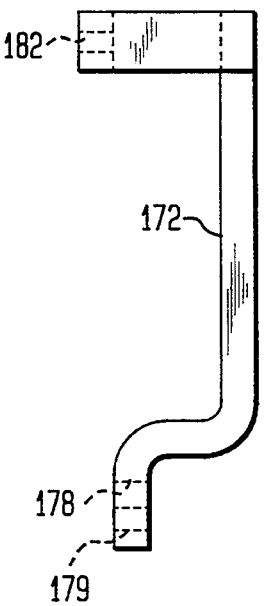
FIG. 23 is a side elevational view of the phase connector of FIG. 21.
Figure 22:
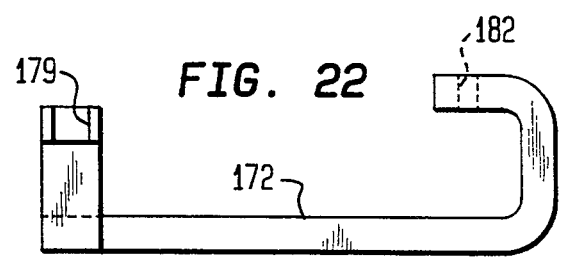
FIG. 22 is a front elevational view of the phase connector of FIG. 21.

Another embodiment of field installation connector 78A details are best seen in FIGS. 17-20B. Referring to FIGS. 17 and 20, the connector 78A preferably has a clamshell construction insulator housing 160 (which also is referred to herein as the "clamshell" or the "insulator"), which is formed of thermoplastic material, such as 94 VO rated polypropylene. The clamshell insulator 160 defines a living hinge 162, which may be formed by a groove or depression in the molding, for easy folding along the hinge in order to form both sides of the insulating structure. It should be noted that the insulator 160 could be formed of two or more separate pieces which are combined to form a unitized structure.

In the preferred embodiment, as shown in FIGS. 20A and 20B, the halves of the clamshell insulator 160 are attached to each other by means of integrally formed male cantilevered snap fittings 163 which mate with holes 163A formed in the opposite side of the clamshell insulator. Alternatively, the clamshell halves can be attached to each other by way of other fastening techniques known in the industry, such as christmas tree fasteners (see FIGS. 15 and 16 of U.S. Pat. No. 4,536,823), rivets, nuts and bolts, screws, heat welding, solvent welding, glue bonding and ultrasonic welding.

The insulator 160 has dimples 164 projecting toward the interior of the recesses 166, 168 and 170 which are formed to retain phase connectors 172, 174 and 176 for each of the respective A, B and C power phases; see FIG. 18. While dimples 164 are shown projecting from the exterior of insulator housing 160 in FIG. 20, it should be understood that the dimples also project into the interior of the housing. Dimples 164 help to minimize contact between the connectors 172, 174 and 176 with the insulator 160 and help meet oversurface requirements under electrical code standards. If desired, the installation connector 78A can be configured for single-phase applications as shown in FIG. 19, by utilization of only the A- and C-phase connectors 172 and 176.

The phase connectors 172, 174 and 176 are generally L-shaped and differ essentially only in the lengths of the legs of the L's. Hence, only the longest connector 172 for the A phase will be described in detail, it being understood that the same features are applicable to the B- and C-phase connectors 174 and 176. Connector 172 is preferably constructed of stamped, tin plated copper, but it is understood that it may be constructed of alternative materials and by different fabrication techniques as were previously described with respect to the busbars 46, 48 and 50.

Referring to FIGS. 18, 21, 22 and 23, the A-phase connector 172 has a hole 178 for a fastener which will attach the connector to the A-phase busbar 46. The connector 172 also has a radiused notch 179 for capture of the busbar 46 antirotation dimple 150. Fastener 180 is then passed through hole 178 of the connector 172 and corresponding hole 156 in the busbar 46. When the fastener 180 is tightened, the relative abutment of the dimple 150 and notch 179 prevent rotation of the connector 172 relative to the busbar 46. It should be understood that the connector to busbar mounting system described for the A phase is also applicable to the B- and C-phase connectors 174 and 176 as well as for main lug 37 attachment to each phase busbar in main lug panelboard applications.

The opposite end of connector 172 has a hole 182 for direct attachment of the A-phase load terminal of a main breaker 37, as is generally shown in exploded view in FIG. 2. The connectors for the B and C phases also have respective holes 184 and 186 for attachment thereto of the respective B- and C-phase load terminals of the main breaker with fasteners 188.

Figure 24:
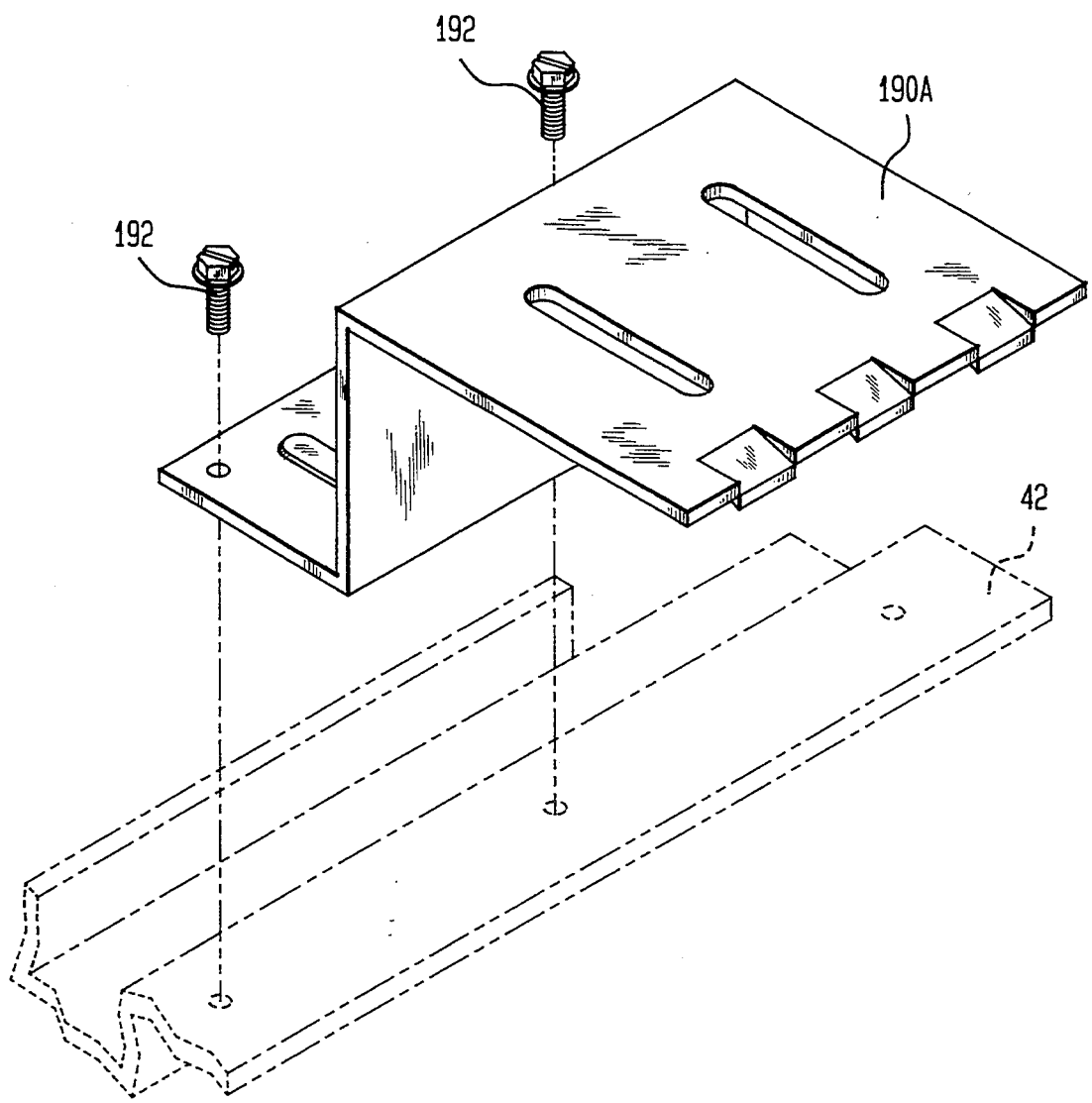
FIG. 24 is a perspective view of a support bracket utilized to support a main breaker, with the panelboard base rail shown in phantom view.

FIG. 24 shows an embodiment of a support bracket 190A which attaches to the base rail 42 (shown in phantom lines) by way of fasteners 192. The end of the support bracket 190A which is distal the base rail 42 is connected to the main breaker 34 for additional support thereof.

Another embodiment of a support bracket 190 is shown in FIG. 2.

Neutral Lug Attachment

FIG. 25 shows neutral lug 39 and its attachment to the neutral crossbar 70 by abutment of a support bracket 194 against the lug 39 and passage of fasteners 196 through both the bracket and lug, into the holes 124 defined by the crossbar. Thus, the neutral lug is positioned within a gutter barrier 112 of the neutral/bus support 44. As a feature of the invention, the neutral lug 39 may be positioned in any one of the four gutter barriers 112 which is convenient for installation, this desired installation feature resulting from the symmetrical array of the neutrals and neutral/bus supports 44. The neutral rails 68 are affixed to the crossbar tie strap 70 by fasteners 72 which are inserted into hole 73 defined by the crossbar.

The Deadfront

Figure 26:
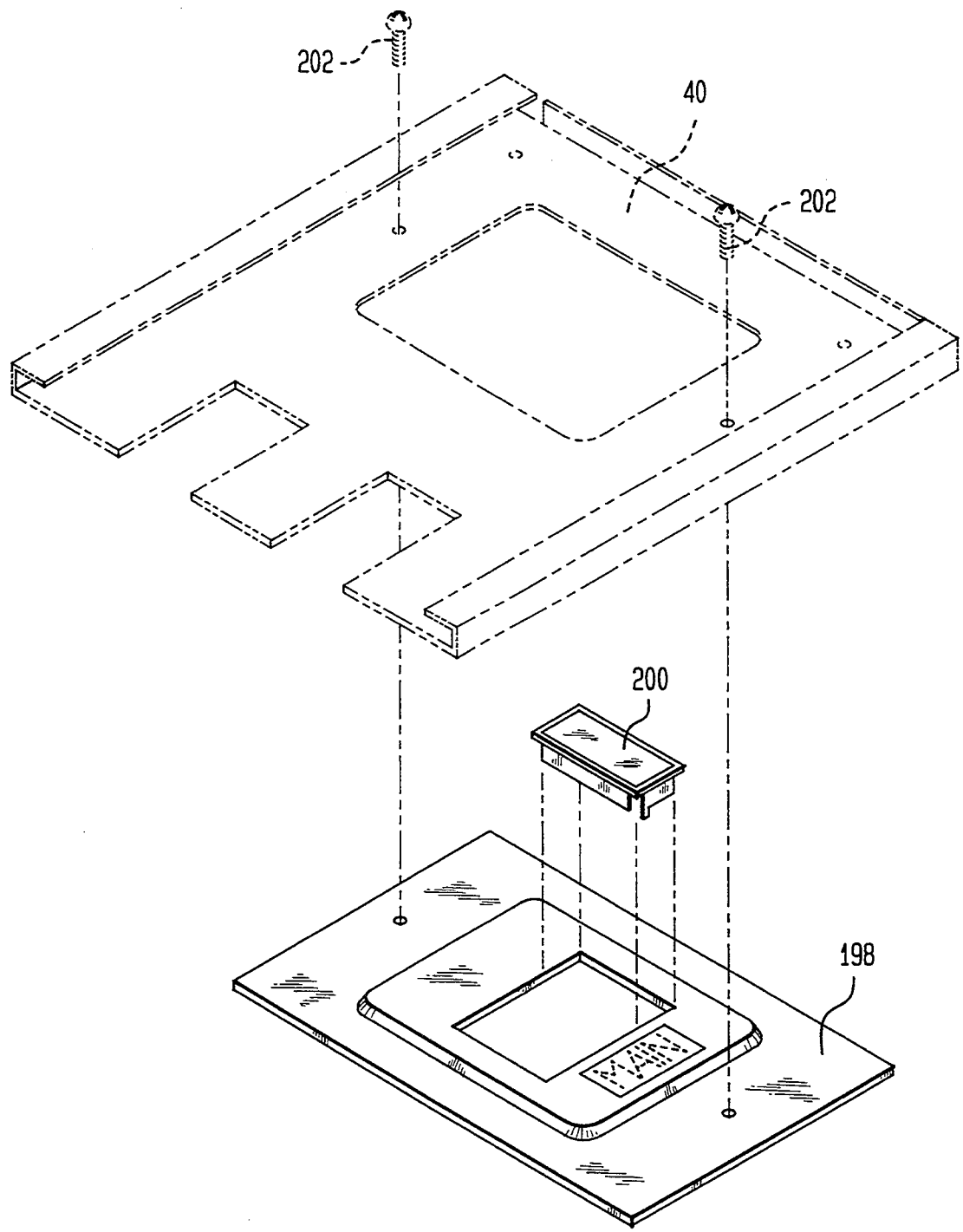
FIG. 26 is an exploded view of the deadfront panel of the panelboard of the present invention.

Referring to FIGS. 1-3 and 26, the deadfront 40 is attached to the panelboard 30 in known fashion by way of corner screws. The deadfront includes symmetrically placed upper and lower cutouts 197 for projection of the main breaker 34 actuation handle for either top or bottom feed applications. A cover plate 198 is attached to the deadfront 40 over each of the cutouts 197. If no main breaker 34 actuation handle is intended to project through the deadfront 40, the cover plate 198 is solid; otherwise the cover plate has a hole for passage of the main breaker actuation handle therethrough. Main breaker cover plates 198 as shown in FIG. 26 may also have a trim 200 to fill any gap between the cover plate and the main breaker 34 actuation handle. Fasteners 202 attach cover plates 198 to the deadfront 40.

Conclusions

The panelboard of the present invention offers many structural features desirable to consumers, including ready conversion from top to bottom power feed, easy field conversion from main lug to main breaker applications and vice versa by way of unitized, simple to install installation connectors 78, and the capability of 200% rated neutrals which allow attachment of the neutral lug in any one of four convenient locations. The panelboard of the present invention is also desirably constructed of a minimum number of symmetrical components in order to reduce parts inventory and ease assembly, in order to effectuate inventory and labor cost savings.

As can be readily understood by those skilled in the art, the present invention as claimed herein can be practiced in ways which differ from the precise exemplary embodiments shown and described in this specification yet which fall within the scope of the claims. For example, the main breaker 34 can be replaced with a fused switch as the circuit protection device. Also, the panelboard may be utilized as a subfeed-type panelboard rather than as a main feed-type panelboard.

What is claimed is:

1. A panelboard for distribution of electrical power from a feed line to branch power lines comprising:
   a. at least one neutral/bus support assembly having:
      i. at least one insulating member, and
      ii. a conductive neutral tie strap attached to the insulating member for conduction of neutral phase current, providing an attachment point for a neutral lug, and for structural support of the neutral/bus support assembly in conjunction with the insulating member;
   b. at least one neutral rail connected to the neutral tie strap, for connection of the neutral conduction path of branch power lines distributed from the panelboard;
   c. at least one busbar disposed over the neutral/bus support assembly, defining a hole therein, the busbar adapted for transferring electrical power from a feed line to a line end of a branch circuit breaker connectable to the busbar;
   d. a top barrier disposed over the busbar and coupled with the neutral/bus support assembly for capturing the busbar therebetween, the top barrier having a top surface adapted for placement of branch circuit breaker thereon; and
   e. a locating pin projecting from at least one of the neutral/bus support assembly and top barrier for capture within the hole defined by the busbar.

2. The panelboard of claim 1, further comprising:
   a. a pair of neutral/bus support assemblies and a pair of locating pins;
   b. a pair of holes defined by the busbar for capture therein of the locating pins; and
   c. wherein the neutral rail is attached to each of the neutral tie straps of both neutral/bus support assemblies.

3. The panelboard of claim 1, wherein the neutral tie strap is captured within the neutral/bus support assembly.

4. The panelboard of claim 3 further comprising a bendable barrier gutter attached to the neutral/bus support assembly for facilitation of insertion of the neutral tie strap within the assembly.

5. The panelboard of claim 1 wherein the busbar has a corrugated profile having integrally formed, raised projecting portions for direct attachment of a line end of a branch circuit breaker thereto.

6. The panelboard of claim 5 further comprising:
   a. at least a second busbar, coupled to the neutral/bus support assembly, oriented laterally with respect to and generally parallel to the corrugated profile busbar; and
   b. at least one connecting strap attached to the second busbar for direct attachment thereto of a line end of a branch circuit breaker.

7. The panelboard of claim 1 further comprising a pair of neutral rails attached to the neutral tie strap.

8. A panelboard for distribution of electrical power from a feed line to branch power lines comprising:
   a. at least one neutral/bus support assembly having:
      i. an insulating bus support,
      ii. an insulating neutral barrier having a gutter barrier on one end thereof, and
      iii. a conductive neutral tie strap having a periphery at least partially shielded by the neutral barrier and attached to both the neutral barrier and the bus support for conduction of neutral phase current, providing an attachment point, and for structural support of the neutral/bus support assembly;
   b. at least one neutral rail connected to the neutral tie strap, for connection of the neutral conduction path of branch power lines distributed from the panelboard;
   c. at least one busbar disposed over the neutral/bus support assembly, defining a hole therein, the busbar adapted for transferring electrical power from a feed line to a line end of a branch circuit breaker connectable to the busbar;
   d. a top barrier disposed over the busbar and coupled with the neutral/bus support assembly for capturing the busbar therebetween, the top barrier having a top surface adapted for placement of branch circuit breaker thereon; and
   e. a locating pin projecting from at least one of the neutral/bus support assembly and top barrier for capture within the hole defined by the busbar.

9. The panelboard of claim 8, further comprising:
   a. a pair of neutral/bus support assemblies and a pair of locating pins;
   b. a pair of holes defined by the busbar for capture therein of the locating pins; and
   c. wherein the neutral rail is attached to each of the neutral tie straps of both neutral/bus support assemblies.

10. The panelboard of claim 9 further comprising a pair of neutral rails connected to both of the neutral tie straps in a closed, generally rectangular current carrying loop.

11. The panelboard of claim 8, wherein the neutral tie strap is captured within the neutral/bus support assembly.

12. The panelboard of claim 11, wherein the barrier gutter is bendable for facilitation of insertion of the neutral tie strap within the assembly.

13. The panelboard of claim 8 wherein the busbar has a corrugated profile having integrally formed, raised projecting portions for direct attachment of a line end of a branch circuit breaker thereto.

14. The panelboard of claim 13 further comprising:
a. at least a second busbar, coupled to the neutral/bus support assembly, oriented laterally with respect to and generally parallel to the corrugated profile busbar; and
b. at least one connecting strap attached to the second busbar for direct attachment thereto of a line end of a branch circuit breaker.

15. The panelboard of claim 14 further comprising:
a. a third busbar, coupled to the neutral/bus support assembly, oriented laterally with respect to and generally parallel to the corrugated profile busbar so that the second and third busbars flank the corrugated busbar; and
b. at least one connecting strap attached to the third busbar for direct attachment thereto of a line end of a branch circuit breaker.

16. The panelboard of claim 8 further comprising a pair of neutral rails attached to the neutral tie strap.

17. A panelboard for distribution of electrical power from a feed line to branch power lines comprising:
a. a panelboard enclosure;
b. a pair of base rails attached to the panelboard enclosure;
c. a pair of neutral/bus support assemblies each having:
   i. an insulating bus support having at least one locating pin projecting therefrom,
   ii. an insulating neutral barrier having a gutter barrier on one end thereof;
   iii. a conductive neutral tie strap having a periphery at least partially shielded by the neutral barrier and attached to both the neutral barrier and the bus support for conduction of neutral phase current, providing an attachment point at a position which is shielded by the gutter barrier, and for structural support of the neutral/bus support assembly;
d. a pair of neutral rails connected to both of the neutral tie straps, for connection of the neutral conduction path of branch power lines distributed from the panelboard;
e. at least one busbar disposed over the neutral/bus support assemblies, defining a pair of holes therein for capture therein of the respective locating pin projecting from each of the bus supports, the busbar adapted for transferring electrical power from a feed line to a line end of a branch circuit breaker connectable to the busbar; and
f. a top barrier disposed over the busbar and coupled with each of the neutral/bus support assemblies for capturing the busbar therebetween, and the top barrier also being connected to each of the base rails, the top barrier having a top surface adapted for attachment of branch circuit breaker thereon.

18. The panelboard of claim 17, wherein at least one of the neutral tie straps is captured within one of the neutral/bus support assemblies.

19. The panelboard of claim 17 wherein the barrier gutter of said one of the neutral/bus support assemblies is bendable for facilitation of insertion of the neutral tie strap within the assembly.

20. The panelboard of claim 17 wherein the busbar has a corrugated profile having integrally formed, raised projecting portions for direct attachment of a line end of a branch circuit breaker thereto.

21. The panelboard of claim 17 further comprising:
a. a second busbar, coupled to the neutral/bus support assembly, oriented laterally with respect to and generally parallel to the corrugated profile busbar;
b. at least one connecting strap attached to the second busbar for direct attachment thereto of a line end of a branch circuit breaker;
c. a third busbar, coupled to the neutral/bus support assembly, oriented laterally with respect to and generally parallel to the corrugated profile busbar so that the second and third busbars flank the corrugated busbar; and
d. at least one connecting strap attached to the third busbar for direct attachment thereto of a line end of a branch circuit breaker.

22. The panelboard of claim 17, wherein a neutral lug is selectively mountable on either of the two ends of either of the neutral tie straps at the attachment points.

* * * * *